March 14, 1967  R. R. GAY ET AL  3,308,783
AMPHIBIOUS VEHICLE
Filed Oct. 20, 1965
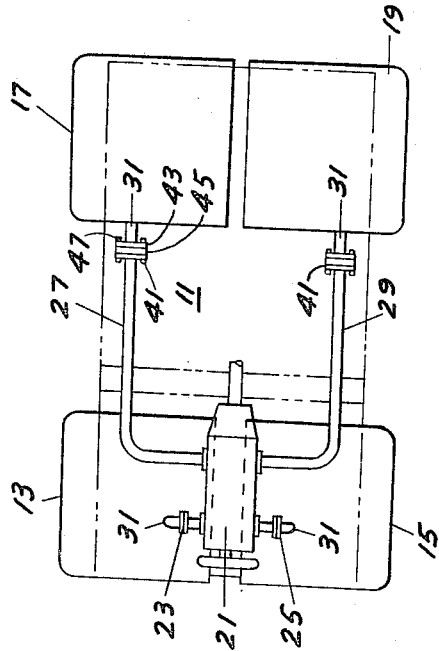
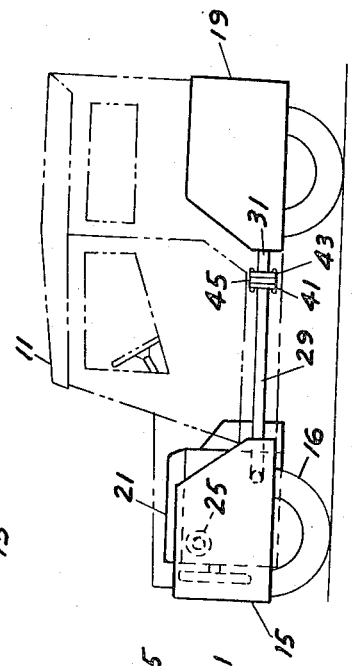
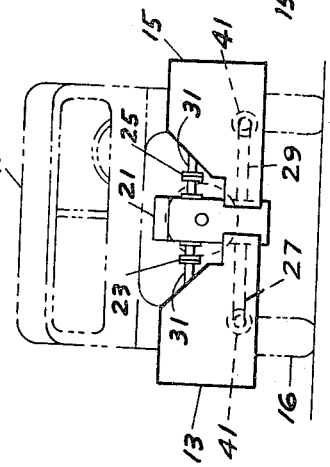
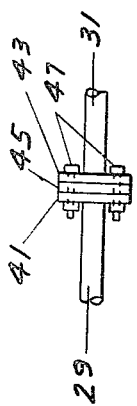
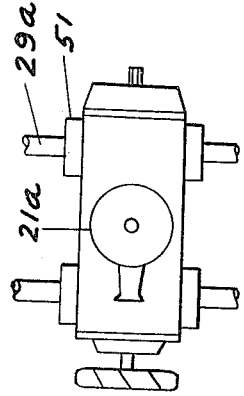
ROGER R. GAY
FELIX R. WINSEN
INVENTORS
BY Harry M. Saragovitz,
Edward J. Kelly, Herbert Berl
& Robert M. Lyon
ATTORNEYS

# United States Patent Office 3,308,783
Patented Mar. 14, 1967

3,308,783
AMPHIBIOUS VEHICLE
Roger R. Gay, Bloomfield Hills, and Felix R. Winsen, Royal Oak, Mich., assignors to the United States of America as represented by the Secretary of the Army
Filed Oct. 20, 1965, Ser. No. 499,109
11 Claims. (Cl. 115—1)

This invention described herein may be manufactured and used by or for the Government for governmental purposes without the payment to us or any royalty thereon.

This invention relates to amphibious vehicles. More particularly, the invention teaches an apparatus for modifying a land vehicle in such a way as to convert it to an amphibian. Although the invention taught herein may be used upon many varied types and classes of vehicles, it is illustrated as used with a "four-by-four General Purpose Vehicle." During World War II, this vehicle became known as the jeep and shall be so referred to here.

In operating a vehicle in off-highway or cross-country conditons, it is important that the vehicle be capable of traversing as many types of terrain as possible. At present, many vehicles are restricted in their capability due to the fact that they can cross bodies of water only by means of bridges or barges.

An object of this invention is to provide a novel, amphibious, automotive vehicle.

Another object is to provide a method and apparatus to allow the utilization of previously land-bound vehicles in water-crossing maneuvers.

Another object of the invention is to provide flotation means for a vehicle which are integral with the structure of the vehicle, obviating the necessity of placing pontoons on the vehicle.

A further object of the invention is to utilize the vehicle engine exhaust gases to provide the necessary buoyancy forces to maintain the vehicle in an afloat posture.

A further object of the invention is to eliminate the buoyancy problems inherent in a water-tight hull vehicle.

A still further object of the invention is to provide an amphibious vehicle which can operate easily both on land and in water without requiring the attachment of special equipment to adapt it from land to aquatic use.

Other attempts to provide flotation means for vehicles have only a slight degree of practicality for actual use.

One such means, the use of temporarily attached pontoons, has been shown in United States Patent 2,514,488 to Hale et al. This device requires the addition of a great deal of weight to a vehicle which causes the vehicle to suffer a loss in maneuverability and also requires a special make-up and break-down of the pontoons each time the vehicle enters and leaves a body of water.

Other attempts to provide buoyancy utilize vehicle exhaust gases. These have all proven to be unsatisfactory and unsuccessful however. One such method attempts to capture the exhaust gases in an enclosed area under the entire vehicle but these vehicles exhibit a strong tendency to capsize. Another method withdraws exhaust gases from the engine manifold, piping them into the fender areas. Due to the tendency of the gases to rise to the highest possible area—if one side, end, or corner was more heavily loaded than the others—the vehicle would sink by the lower point when the gases traveled to the higher point. Even if the vehicle is uniformly loaded, any rocking of it by personnel or mildly turbulent waters will cause it to sink for the same reason. In trying to overcome this last problem, attempts have been made to utilize costly and complicated systems of valves to direct the gases to the fender most in need. In addition to being economically unfeasible, this method has been only mildly successful.

Other objects including means for obviating the prior art deficiencies will be apparent during the course of the following description which is intended to be only an illustration and is not intended to restrict or limit the scope of the invention.

FIGURE 1 is a top view of a jeep, in section, showing the manner of piping exhaust gases to the fenders.

FIGURES 2 and 3 are front and side elevations of the jeep respectively, showing the placement of the fenders thereon.

FIGURE 4 shows a means for connecting an exhaust pipe and a fender for transfer of the exhaust gases.

FIGURE 5 is an elevation showing the invention utilized with an engine having more cylinders than the number of fenders on the vehicle.

Referring now to FIGURES 1–3, there is shown a standard military jeep 11 having a four-cylinder engine 21 and four separate wheel wells 13, 15, 17 and 19. Individual exhaust pipes 23, 25, 27 and 29 are each connected to individual cylinder exhaust ports of the vehicle engine by suitable fastening means. Each pipe is routed, in any suitable manner, to one fender well and connected, with gaskets and fastening means, to the fender well. The pipes are shown as connected to the fender wells at openings 31.

Mufflers (not shown) of any conventional design may be inserted in each pipe for noise suppression. These exhaust pipes may be used at all times or, by means of a suitable valve (not shown), may be utilized only when necessary to provide flotation. Check valves (also not shown) may be utilized in each pipe to prevent reverse flow of water into the exhaust pipes.

Each wheel well is enclosed and sealed essentially gas tight on the top and all sides. This can be done by either manufacturing the fenders as integral units or by filling small holes with welding or a waterproof sealant. At least some portion of the bottom of each well will be open.

If desired, it is foreseen that other types of inverted, openended means similar to the described fenders could be utilized either in place of the fenders or in addition to them. For example, two such means could be used to receive gases from fifth and sixth cylinders in a six-cylinder engine.

FIGURE 4 shows a means for connecting an exhaust pipe to a fender opening by means of flanges 41 and 43 connected to pipe 29 and opening 31 respectively. The flanges are separated by a gasket 45 and are connected by bolts 47.

In FIGURE 5, an engine 21a is illustrated having more than four cylinders and having multiple cylinder exhaust ports connected to one exhaust pipe 29a by means of a short manifold 51. The exhaust pipe may then be connected to one fender.

In operation, exhaust gas flows into each wheel well. When the vehicle is driven into the water, the lower edges are sealed by water and sufficient pressure will be generated by the engine to prevent water entry and to make up for any leakage. Excess exhaust gas will discharge through the bottom openings, thus automatically regulating the gas pressure.

In practice, it has been found that the jeep engine will not stall due to backpressure because of its operating characteristics. For example, in one engine tested, the maximum backpressure under which the engine could operate was 2.25 p.s.i. In that vehicle, the distance between the top of the water surface and the bottom of the fender skirt was approximately 23 inches. Since the pressure exerted by 23 inches of water is less than 1.0 p.s.i. under normal conditions, no difficulty was experienced and excess gas merely bubbled out from under the skirt.

To float a vehicle which would tend to sink more than four feet (2.25 p.s.i.), an engine would be used which can operate under a greater backpressure.

It has also been found that the vehicle will propel itself through the water by the revolution of its wheels. The turning of the wheels at excessive speeds tends to lower the vehicle in the water as the gas is drawn out of the fender by the wheel and as water is drawn into the fender. This can be rectified by merely declutching the vehicle drive and allowing the engine to again build up the pressure in the fenders.

For the purpose of alleviating the problem of sinking upon rapid spinning of the wheels, it is possible to enclose at least a portion of the openings at the bottom of each well by adding baffles or plating to extend from the fender walls to within a slight distance from each wheel.

If a larger engine were to be used, e.g. an eight cylinder engine, two exhaust pipes could be run to each fender or the extra combustion exhaust gases could be routed through a standard exhaust system rather than utilize the system shown in FIGURE 5 if desired.

It is to be understood that the above description of the invention is to show an illustrative embodiment only and that various changes in the size, shape and arrangement of parts may be resorted to without departing from the spirit of the invention or the scope of the claims.

We claim:

1. In a vehicle, means for making said vehicle amphibious comprising;
   an internal combustion engine,
   means for releasing combustion exhaust gases from said engine,
   a plurality of means attached to said vehicle which are substantially gas-tight only when said vehicle is afloat,
   and individual means attached to said exhaust gas releasing means for transferring exhaust gas to only one of said gas-tight means, said individual means being so attached to said exhaust gas releasing means as to preclude transfer of gas from one of said gas-tight means to any other of said gas-tight means.

2. The apparatus of claim 1 wherein the gas-tight means attached to said vehicle are the fenders of the vehicle.

3. Apparatus for applying buoyancy forces to an automotive vehicle comprising:
   an internal combustion, piston-cylinder, type engine,
   fenders forming wheel wells on said vehicle and having openings to the atmosphere therein only in the areas through which the wheels extend for road surface contact, and
   individual means on each cylinder for collecting exhaust gas from said cylinders of said engine and for transferring said gas from the cylinders to said fenders, wherein the exhaust gas from each cylinder is transferred to no more than one fender.

4. The apparatus of claim 3 wherein the said engine is the propulsion engine of said vehicle.

5. Apparatus for applying buoyancy forces to an automotive vehicle comprising:
   an internal combustion, piston-cylinder type engine,
   fenders forming wheel wells on said vehicle and having openings to the atmosphere therein only in the areas through which the wheels extend for road surface contact,
   means for collecting exhaust gases from less than all of the cylinders of said engine, said collecting means being, in number, no less than the number of fenders on said vehicle, and
   means for connecting at least one of said collecting means to each of said fenders for the transfer of exhaust gases to said fenders.

6. The apparatus of claim 5 wherein the said engine is utilized to provide propulsion force to the vehicle.

7. Apparatus for applying buoyancy force to a vehicle comprising:
   an internal combustion engine,
   combustion cylinders in said engine,
   one end of a transfer means connected to the exhaust port of one of said cylinders,
   the other end of said transfer means connected to a fender on said vehicle, said fender shaped so as to allow the collection of gas from said transfer means.

8. The apparatus of claim 7 wherein each fender is provided with an opening for the escape of exhaust gas which is in excess of the buoyancy force requirements of said vehicle.

9. The apparatus of claim 7 wherein the said one end of said transfer means is connected to more than one but less than all of the exhaust ports of said cylinders.

10. The apparatus of claim 7 wherein the said engine provides propulsion force to said vehicle.

11. The apparatus of claim 7 wherein there are multiple fenders on said vehicle, wherein each cylinder is provided with an individual exhaust gas collection and transfer means, and wherein each fender has at least one individual collection and transfer means connected to it.

References Cited by the Examiner

FOREIGN PATENTS 994,367   6/1965   Great Britain.

MILTON BUCHLER, *Primary Examiner.*

ANDREW H. FARRELL, *Examiner.*